United States Patent Office 2,754,276
Patented July 10, 1956

2,754,276

CELLULAR COMPOSITIONS UTILIZING DINITROSOPENTAMETHYLENE - TETRAMINE AS THE BLOWING AGENT

Joseph Frederic Walker, Lewiston, N. Y., and Harry Douglas Williams, Penns Grove, N. J., assignors to E. I. du Pont de Nemours and Company, Wilmington, Del., a corporation of Delaware No Drawing. Application February 12, 1953,
Serial No. 336,642

4 Claims. (Cl. 260—2.5)

This invention relates to the art of preparing cellular compositions of elastomers, plastics, resins, and the like.

It has already been proposed to form cellular compositions by using dinitrosopentamethylenetetramine (DNPT) as the blowing agent. The blowing agent composition thus composed is usually dispersed by grinding with a plasticizer and incorporated into the rubber or plastic composition before milling or mixing. The composition is then expanded in the usual manner, for instance, by heating under pressure. Previous processes for making expanded rubber and plastics with DNPT require the use of acid activators to lower its decomposition temperature from about 200° C., when pure, to 100° C. or below. The use of acids is often undesirable, however. Unpleasant amine odors, which are imparted to the expanded polymer, are formed on the decomposition of DNPT in acid media. Furthermore, the presence of acids reduces the thermal stability of polyvinyl chloride and increases the tendency toward discoloration.

The object of the present invention is the production of an improved blowing agent composition containing DNPT as an active ingredient. A further object is such a blowing agent characterized by the fact that it does not impart an undesirable odor to the expanded cellular product. Other objects will be appreciated from the following description of the invention.

According to the present invention, DNPT blowing agent compositions are improved by including therein additional ingredients which serve to eliminate the unpleasant odor formerly encountered in cellular products expanded by means of DNPT compositions. It has been determined in accordance with the invention that this desirable result may be obtained by incorporating in the blowing agent composition along with the DNPT, an activator selected from the group consistig of non-acidic materials containing hydroxyl groups, and materials which may exist in tautomeric forms which contain hydroxyl groups, and thio analogs of such hydroxyl compounds. The invention may be more readily understood by considering the following examples:

Example 1

A plastisol was prepared by stirring together thoroughly the following ingredients:

| | Parts |
|---|---|
| Plastisol grade polyvinyl chloride | 100 |
| Di-(2-ethylhexyl)-phthalate | 150 |
| Basic lead carbonate | 10 |
| DNPT | 12 |
| Urea | 10 |

The plastisol was heated in a closed circular mold 3″ in inside diameter and ¼″ deep for 3 minutes with 120 p. s. i. g. steam. The mold was cooled to room temperature. The partially expanded cellular product was removed from the mold and heated for 15 minutes at 100° C. The final product was a white, practically odorless sponge 6¼″ in diameter and ½″ thick. It had a fine and even cell structure.

Example 2

A plastisol was prepared by stirring together thoroughly the following ingredients:

| | Parts |
|---|---|
| Plastisol grade polyvinyl chloride | 100 |
| Di-(2-ethylhexyl)-phthalate | 150 |
| Basic lead carbonate | 10 |
| DNPT | 10 |
| Tris-(hydroxymethyl)-aminomethane | 12 |
| | 20 |

The plastisol was then treated as in Example 1. The final product was a white, practically odorless sponge 6¼″ in diameter and ½″ thick. It had a very fine and uniform cell structure.

Example 3

A rubber stock was prepared by milling together the following ingredients:

| | Parts |
|---|---|
| Government synthetic rubber, Type GR-S-50 | 100 |
| Whiting | 50 |
| Light petroleum oil | 10 |
| Petrolatum | 3 |
| Sulfur | 3.5 |
| Zinc oxide | 5 |
| Zinc salt of mercaptobenzthiazole | 0.5 |
| Di-(o-tolyl)-guanidine | 0.1 |
| 40% DNPT/60% inert filler | 7 |
| Urea | 4 |

The milled composition was precured by heating under pressure in a circular mold 3″ in inside diameter and ¼″ deep for 4 minutes with 60 p. s. i. g. steam. The mold was opened and the expanded rubber disc allowed to pop from the mold. The disc was given a final cure of 5 minutes with 60 p. s. i. g. steam in an atmospheric pressure mold. The final product was a light-colored, fine-celled sponge 4⅜″ in diameter and ⅜″ thick.

Example 4

A rubber stock was prepared by milling together the following ingredients:

| | Parts |
|---|---|
| Natural rubber, pale crepe, Mooney plasticity 85 | 100 |
| Zinc stearate | 5 |
| York whiting | 50 |
| Sulfur | 3.5 |
| Benzthiazyl disulfide | 0.27 |
| Light petroleum oil | 16 |
| 40% DNPT/60% inert filler | 7 |
| Biuret | 4 |

The milled composition was precured for 6 minutes as in Example 3. The mold was opened and the expanded rubber disc allowed to pop from the mold. The disc was then given a final cure of 5 minutes with 60 p. s. i. g. steam in an atmospheric pressure mold. The final product was a light-colored, fine-celled sponge 4⅜″ in diameter and ⅜″ thick.

Example 5

A rubber stock was prepared by milling together the following ingredients:

| | Parts |
|---|---|
| Synthetic rubber, neoprene Type W | 100 |
| York whiting | 50 |
| Petrolatum | 3 |
| Light petroleum oil | 10 |
| MgO | 4 |
| ZnO | 5 |
| Dipentamethylenethiuramtetrasulfide | 3 |
| 40% DNPT/60% inert filler | 7 |
| Dimethylolurea | 4 |

The milled composition was cured for 12 minutes as in Example 3. The final product was a light tan, fine-celled sponge, 4 13/16" in diameter and 7/16" thick.

*Example 6*

The following ingredients were milled together at 100° C. on a 2-roll mill:

| | Parts |
|---|---|
| Polyethylene | 100 |
| Polyisobutylene | 50 |
| 40% DNPT/60% inert filler | 5 |
| Urea | 1.7 |

The milled composition was heated for 30 minutes at 150° in a 1/3-full closed circular mold 2" in inside diameter and 2" deep which was clamped between two steel platens. The resulting expanded plastic had a density of 0.30.

Typical activators and the volume of gas evolved in 15 minutes when excess activator was mixed with 0.2 gram of DNPT in an inert medium and plunged into an oil bath at 150° C. are given below. The gas was measured at 25° C. and a pressure of 1 atmosphere.

| Compound: | Gas evolved (ml.) |
|---|---|
| Glycerine | 62 |
| Diethanolamine | 61 |
| Diethyleneglycol | 43 |
| Ethyleneglycol | 55 |
| Tris-(hydroxymethyl)-aminomethane | 50 |
| Ethanolamine | 73 |
| Methyl acetoacetate | 70 |
| Urea | 72 |
| Acetamide | 40 |
| Thiourea | 70 |
| Sorbitan monolaurate | 61 |
| Triethanolamine | 55 |
| Monomethylolhydantoin | 34 |
| Sorbitol | 60 |
| Glucose | 85 |
| Starch | 22 |
| Cellulose | 14 |
| Biuret | (¹) |
| Glycine anhydride | (¹) |
| Dimethylolurea | (¹) |
| No activator | 0 |

¹ Gas evolution so vigorous that foaming-over occurred.

The volume of gas evolved in 15 minutes by plunging the following compounds mixed with 0.2 gram of DNPT in an inert medium into an oil bath at 180° C. was measured at 25° C. and a pressure of 1 atmosphere:

| Compound: | Gas evolved (ml.) |
|---|---|
| Lactose | 84 |
| Sucrose | 68 |
| No activator | 8 |

The most efficient activators are: (1) 1,2-glycols; (2) carboxamides (e. g., urea, biuret), and (3) amino alcohols (e. g., ethanolamine, tris-hydroxy-methyl-aminomethane). Of these three classes, the carboxamides are the most efficient.

On a balance of properties, urea is a preferred activator in view of its low cost. Mixtures of the disclosed activators also are operable; for example, mixtures of biuret or ethylene glycol with finely ground urea are very satisfactory activators.

To get efficient performance and fine cell structure, it is important to disperse the activator in finely divided form throughout the sponge composition. It is usually desirable, therefore, to grind the solid activators to about 100 mesh or finer before incorporating them with the sponge materials. As an aid in preventing caking, the activator may be mixed with a convenient liquid during grinding or immediately after grinding.

By means of the present invention, therefore, it will be possible for blowing agents containing DNPT to be employed far more extensively than heretofore, due to the elimination of the unpleasant odors previously encountered with such unimproved compositions of the prior art. Accordingly, it is intended that the invention be limited only by the following patent claims.

We claim:

1. A composition for use in the preparation of expanded cellular materials comprising the chemical blowing agent dinitrosopentamethylenetetramine and a non-acidic activator for said blowing agent selected from the class of organic compounds consisting of a 1,2 glycol, a carboxamide, and an amino alcohol.

2. The composition of claim 1, wherein the non-acidic material is urea.

3. The composition of claim 1, wherein the non-acidic material is biuret.

4. The composition of claim 1, wherein the non-acidic material is tris-(hydroxymethyl)-aminomethane.

References Cited in the file of this patent

UNITED STATES PATENTS

| 2,444,881 | Sterrett | July 6, 1948 |
| 2,491,709 | Briggs et al. | Dec. 20, 1949 |
| 2,570,182 | Daly et al. | Oct. 9, 1951 |
| 2,582,228 | Brinkema | Jan. 15, 1952 |
| 2,668,152 | O'Neal | Feb. 2, 1954 |
| 2,676,928 | Frank | Apr. 27, 1954 |

FOREIGN PATENTS

| 969,154 | France | Dec. 15, 1950 |

OTHER REFERENCES

Chemistry and Technology of Rubber, 1937, Davis, pages 302 and 303.